United States Patent [19]

Haynes et al.

[11] Patent Number: 5,088,520
[45] Date of Patent: Feb. 18, 1992

[54] MODULAR SOLENID VALVE

[75] Inventors: Andrew S. Haynes, New Carlisle; Charles T. Zakreski, Mishawaka, both of Ind.

[73] Assignee: South Bend Controls, Inc., South Bend, Ind.

[21] Appl. No.: 703,021

[22] Filed: May 20, 1991

[51] Int. Cl.$^5$ ............................................. F16K 31/06
[52] U.S. Cl. ................................. 137/270; 251/129.16
[58] Field of Search ................. 137/270, 269, 271; 251/129.16

[56] References Cited

U.S. PATENT DOCUMENTS

| 3,346,004 | 10/1987 | Costello | 137/271 |
| 4,598,736 | 7/1986 | Chorkey | 137/270 X |
| 4,669,504 | 6/1987 | Fujitsugu | 251/129.16 X |
| 4,756,331 | 7/1988 | Stegmaier | 137/271 |

Primary Examiner—Alan Cohan
Attorney, Agent, or Firm—James D. Hall

[57] ABSTRACT

A multiple component solenoid valve having a valve part, solenoid part and cap part. The solenoid part which actuates the valve part is reversible relative to the valve part so as to allow the valve to be either of a normally-open type or a normally closed-typed.

8 Claims, 2 Drawing Sheets

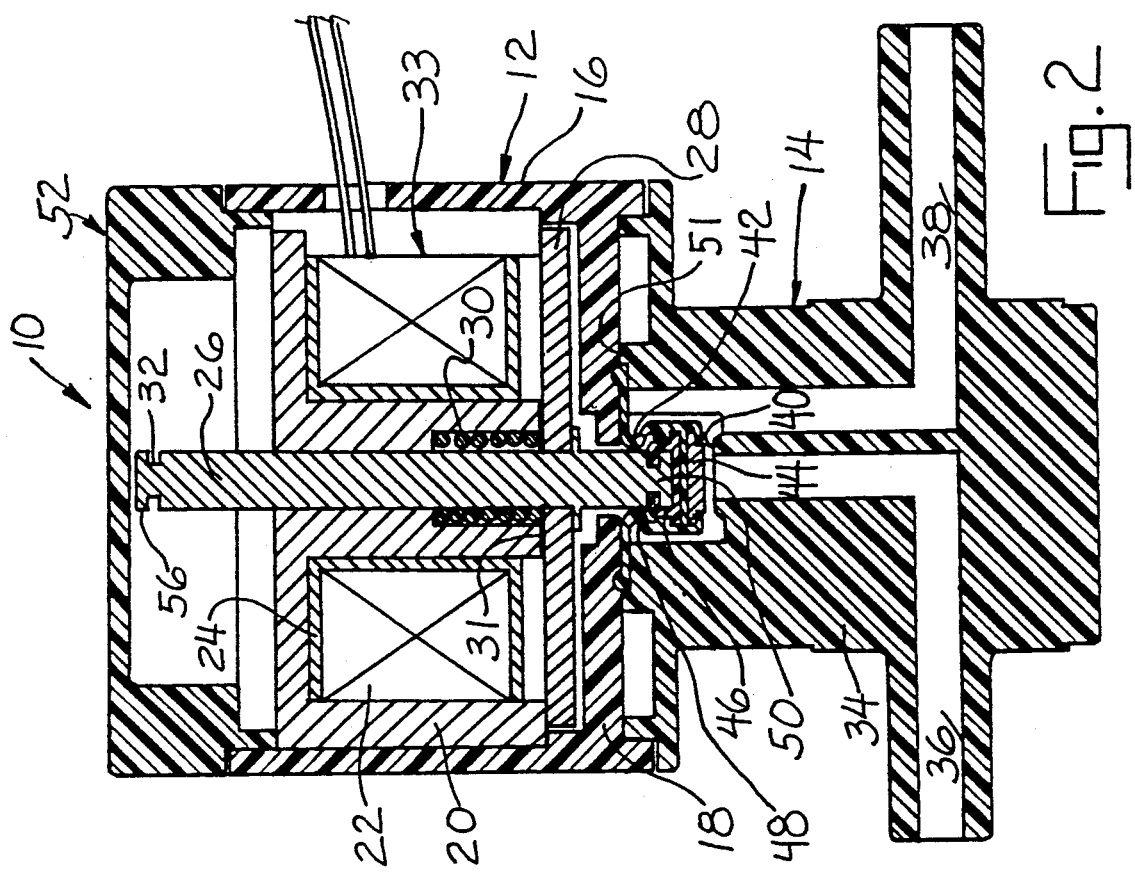
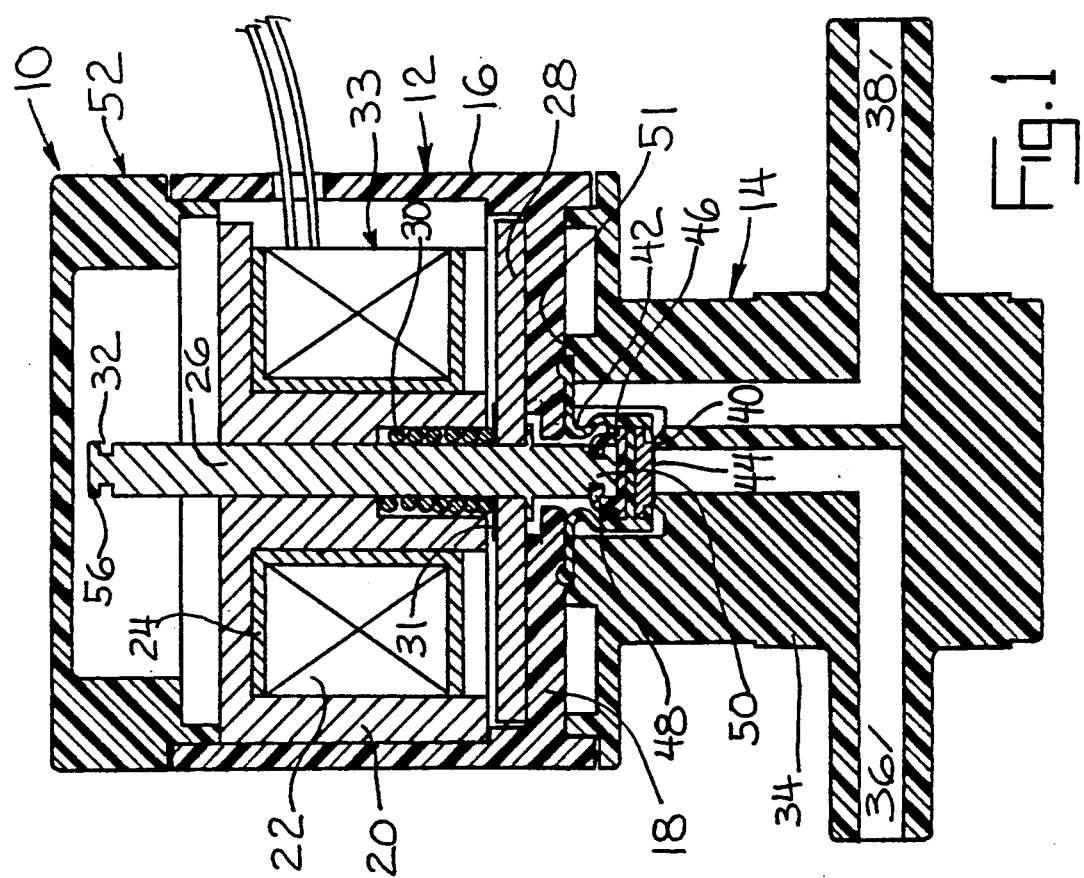

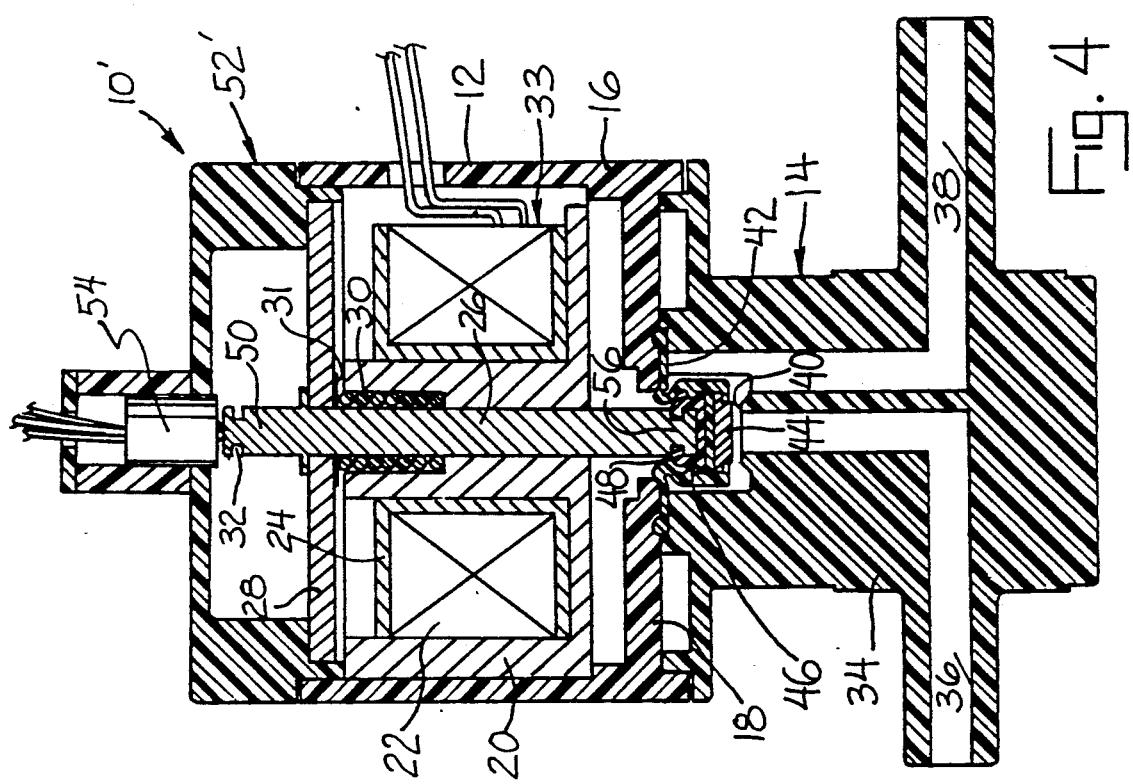
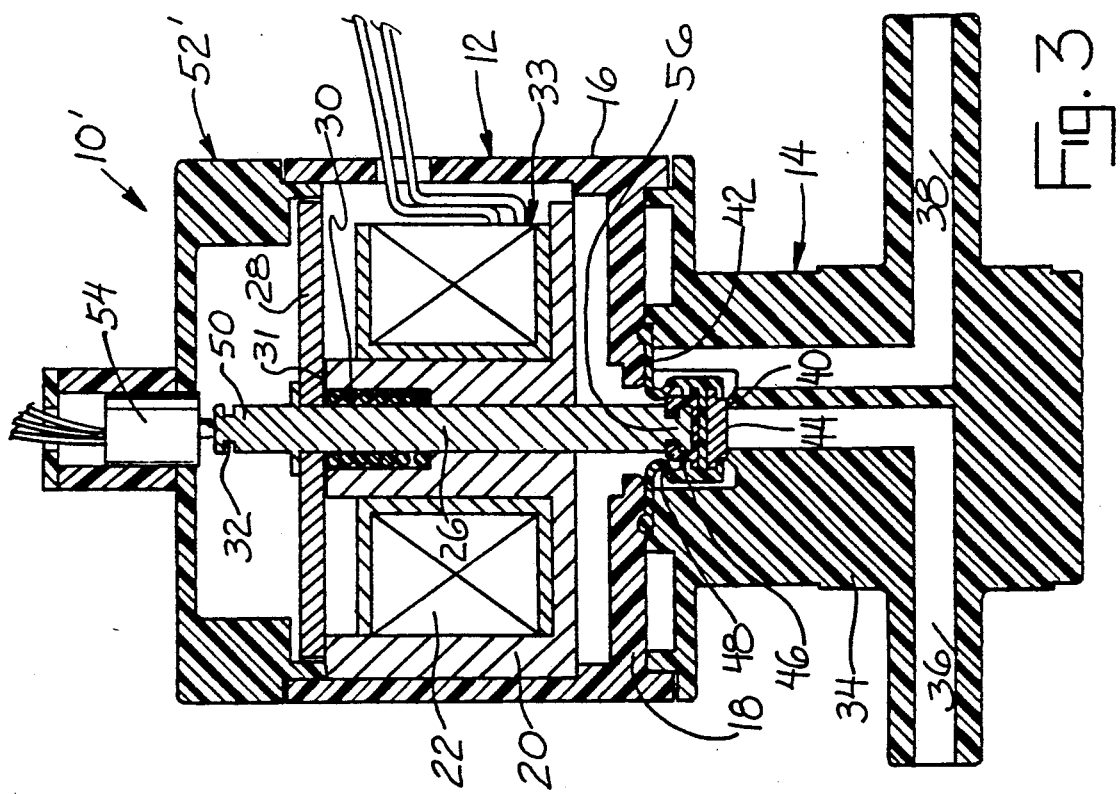

MODULAR SOLENID VALVE

BACKGROUND OF THE INVENTION

This invention relates generally to solenoid valves and has application to a solenoid valve of modular construction.

Multiple component solenoid valves in which the valve part and the solenoid part of the valve are separable are of known construction, as illustrated in U.S. Pat. Nos. 4,496,133 and 4,711,269. Such valves are of a specified construction, allowing for only a specified or fixed method of assembly and manufacture. When the valve is assembled, there is little or no permissible variation in the method of assembly nor the resulting valve structure and operation.

SUMMARY OF THE INVENTION

In the following described invention, the solenoid valve can include three basic sub-assemblies, namely, the valve part, the solenoid part, and the cap part. The solenoid part of the valve which includes the coil and armature is designed so as to be invertible or reversible relative to the cap part and valve part. This enables the armature to be connected to the valve part in one of two orientations to allow the valve to be either of the normally open-type or the normally closed-type.

The reversible features of the solenoid valve of this invention allows the manufacturer to assemble the valve according to the specifications, that is, either normally open or normally closed, of the buyer without the necessity of additional parts. Also, the valve of this invention allows for a simplicity of parts and simple assembly.

Accordingly, it is an object of this invention to provide a solenoid valve which is of modular construction to allow the valve to be assembled in a selected one of a multiplicity of operating modes according to the specification of the valve buyer or user.

Still another object of this invention is to provide a solenoid valve which is of simplified manufacture.

And still another object of this invention is to provide a solenoid valve which is of rapid and simple assembly.

Other objects of this invention will become apparent upon a reading of the following description.

BRIEF DESCRIPTION OF THE DRAWINGS

FIG. 1 is a longitudinal sectional view of one embodiment of the solenoid valve of this invention showing the valve in its normally closed position.

FIG. 2 is a longitudinal sectional view of the valve of FIG. 1 showing the valve in its open position.

FIG. 3 is a longitudinal sectional view of another embodiment of the solenoid valve of this invention showing the valve in its closed position and in association with an operating switch.

FIG. 4 is a longitudinal sectional view of the valve of FIG. 3 with the valve in its normally open position and in association with the operating switch.

FIG. 5 is a perspective view of the valve diaphragm constituting a component of the valve part of this invention.

DESCRIPTION OF THE PREFERRED EMBODIMENTS

The preferred embodiments illustrated are not intended to be exhaustive or to limit the invention to the precise forms disclosed. They are chosen and described in order to fully describe the invention and illustrate its practical use.

In each of the following described embodiments of the invention, there are three basic sub-assemblies of the solenoid valve. Two of these sub-assemblies are the same in each of the embodiments and are identified as solenoid part 12 and valve part 14. Solenoid part 12 includes a housing 16 of a generally cylindrical shape, open at one end and having an end wall 18 at the opposite end. Secured within a fixed position within housing 16 is a coil yoke 20 about which is placed an electromagnetic coil 22 wound upon a bobbin 24. Solenoid part 12 further includes a moveable armature which includes a shaft 26 and a disk 28 which surrounds the shaft. Shaft 26 extends slidably through the center of yoke 20 with disk 28 being secured to the shaft for joint movement with the shaft. A helical spring 30 extends about shaft 26 and is placed in compression between yoke 20 and disk 28 so as to normally bias or urge the disk away from yoke 20 and coil 22. Near each end of shaft 26 there is an annular groove 32. A flexible cushioning washer 31 extends about shaft 26 and is positioned between disk 28 and spring 30. For purposes of further description, solenoid part 12 shall be further defined as including a sub-assembly 33 having the components yoke 20, coil 22, bobbin 24, shaft 26, disk 28, spring 30, and washer 31.

Valve part 14 includes a housing 34 containing an inlet port 36 and an outlet port 38. The number of ports that the valve part may have is not relevant to the invention. As such, the valve part may include the two ports illustrated in the drawings or three or more ports, depending upon the desired use of the solenoid valve. Inlet port 36 of the valve part terminates within the interior of valve part housing 34 in a valve seat 40. Since the solenoid valve illustrated in the figures is a diaphragm isolatable-type, valve part 14 includes a diaphragm 42 which is of a pliable rubber or plastic material. At the side of diaphragm 42 facing valve seat 40, there is carried a valve closure 44 which is of generally rigid construction and at the opposite side of the diaphragm is carried a retainer 46 which is also preferably of a general rigid construction. Retainer 46, as best illustrated in FIG. 5, includes a plurality of inner-radially disposed tabs 48.

Having described the sub-assemblies of solenoid part 12 and valve part 14 of the solenoid valve, each of the preferred embodiments will now be more fully described in its assembled detail. The embodiment of FIGS. 1 and 2, which is illustrative of a normally closed solenoid valve 10, has sub-sub-assembly 33 of solenoid part 12 positioned with disk 28 located next to end wall 18 of the solenoid part housing 16. End 50 of shaft 26 is connected to retainer 46 carried by diaphragm 42 of valve part 14. The valve part 14 is connected, such as by an adhesive or ultrasonic welding, at its housing 34 to housing 16 of the solenoid part with diaphragm 42 fitted compressably between housing end wall 18 and shoulder 51 of the valve part housing 34. With disk 28 abutted against end wall 18, valve closure 44 is urged by spring 30 into sealing engagement with valve seat 40 of the valve part, preventing fluid flow between ports 36 and 38.

Upon the energizing of coil 22 by an electrical source, shaft 26 and connected disk 28 moves upwardly as viewed in the figures relative to yoke 20 and solenoid part housing 16 to cause valve closure 44 to be drawn away from valve seat 40 to allow fluid flow communication between ports 36 and 38. Washer 31 carried upon disk 28 makes compressive contact with yoke 20 to form a cushioning as the disk and yoke are compressed together, thus providing a more silent operating valve. Upon de-energizing of coil 22, spring 30 urges disk 28 and shaft 26 downwardly relative to the view shown in the figures with valve closure 44 again contacting valve seat 40 to isolate ports 36 and 38. A cap part 52 forming a third sub-assembly of the valve covers the open end of solenoid part housing 16 and is secured to the housing either by an adhesive or by ultrasonic welding.

In the illustrated embodiment, cap part 52, housing 16 of solenoid part 12 and housing 34 of valve part 14 are preferably of a non-metallic plastic composition. Yoke 20 and disk 28 are formed from ferrous materials. Shaft 26 while a component of the armature may be but preferably is not within the coil flux path.

Valve 10' illustrated in FIGS. 3 and 4 include the same valve part 14 and solenoid part 12 described with respect to FIGS. 1 and 2 but is shown as a normally open-type valve. This is accomplished by inverting or reversing the orientation of sub-sub-assembly 33 within solenoid part housing 16 so as to locate disk 28 adjacent the cap part sub-assembly. In FIGS. 3 and 4, a cap part 52' is illustrated and includes an actuating switch 54. It is to be understood that for the embodiment 10' of FIGS. 3 and 4, cap part 52 utilized for the embodiment of the valve 10 as shown in FIGS. 1 and 2 could have been substituted in the embodiment of FIGS. 3 and 4. In valve 10' the opposite end 56 of shaft 26 is connected to retainer 46 carried by diaphragm 42. Upon energizing coil 22 of valve 10', the disk 28 and connected shaft 26 shift vertically as oriented in the figures relative to yoke 20 and housing 16 of the solenoid part in a downward fashion to cause valve closure 44 to contact valve seat 40 and to isolate ports 36 and 38, thereby cutting off fluid flow between the ports. Upon de-energizing of coil 22, spring 30 urges disk 28 into contact with cap part 52', thus spacing or separating valve closure 44 from valve seat 40. The opposite end 50 of shaft 26 contacts the trip of switch 54, thus actuating the switch as the shaft shifts vertically during opening and closing movement of the valve. In this manner, switch 54 can be utilized to identify valve status.

It will be observed that in each of the embodiments 10 and 10' of the valve of this invention a mode of operation of the valve can be changed by simply inverting or reversing sub-sub-assembly 33 within valve housing 16. This enables the manufacturer of the valve to maintain a minimal inventory of parts with the valve being formed at assembly as a normally open or normally closed valve according to the specification of the valve user and, in a simple and rapid manner.

Shaft 26 of solenoid part 12 of the valve is connected to diaphragm 42 by being press-fitted into a snap-fit interlock with retainer 46 carried by the diaphragm. The face at each end 50, 56 of the shaft is rounded so as to facilitate snap-fitting insertion of the shaft end into the cavity 58 formed within retainer 46. As an end 50, 56 of shaft 26 is inserted into retainer 46, tabs 48 slightly flex to accommodate movement of the shaft and are then cammed into the groove 32 formed in each end of the shaft.

It is to be understood that the invention is not to be limited to the details above given but may be modified within the scope of the appended claims.

What we claim is:

1. A solenoid valve comprising a valve part and a solenoid part, said valve part including inlet and outlet port means to accommodate fluid flow through the valve part, said solenoid part including a movable armature and an electromagnetic coil means for inducing upon activation magnetic flux through said armature, said armature including a shaft extending through said coil means and being shiftable in one direction upon said induction of magnetic flux by said coil means and biasing means for shifting said shaft in an opposite direction upon the inactivation of said coil means, said shaft having first and second opposite ends each constituting means to terminate fluid flow through the valve part upon shiftable movement of the shaft, said armature and coil means being reversible as a unit relative to said valve part with the selected one of said shaft first and second ends serving to terminate said fluid flow through the valve part.

2. The valve of claim 1 wherein said valve part includes shiftable means for terminating said fluid flow through the valve part, said first and second shaft ends each adapted to engage said shiftable means of the valve part, the selected one of said shaft first and second ends engaging said shiftable means.

3. The valve of claim 2 wherein said shiftable means of the valve part constitutes means separable from said port means and engaging said selected one of the first and second shaft ends.

4. The valve of claim 3 wherein said port means includes a valve seat to accommodate fluid flow through said valve part, said shiftable means being engagable with said valve seat.

5. The valve of claim 4 wherein said shiftable means of the valve part includes a flexible diaphragm carrying a retainer, said solenoid part including a housing having an end wall with opening means therein to accommodate said selected one of the first and second shaft ends, said diaphragm spanning said end wall opening means in a sealing relationship, said selected one of the first and second shaft ends secured to said retainer.

6. The valve of claim 5 wherein said selected one of the first and second shaft ends is snap-fitted to said retainer.

7. The valve of claim 5 and a cap part, said housing having an open end opposite said end wall thereof, said cap part spanning said housing open end.

8. The valve of claim 7 and a switch carried by said cap part, the non-selected end of said first and second shaft ends engaging said switch upon shiftable movement of said shaft.

* * * * *

UNITED STATES PATENT AND TRADEMARK OFFICE
CERTIFICATE OF CORRECTION

PATENT NO. : 5,088,520
DATED : February 18, 1992
INVENTOR(S) : Andrew S. Haynes, et. al.

It is certified that error appears in the above-identified patent and that said Letters Patent is hereby corrected as shown below:

On the Title page, item [54], Solenid corrected to read Solenoid

Column 1, line 60, Fig. 5 is a perspective view of the value diaphragm constituting a component of the valve part of this invention. Delete this from line 60 until line 62.

Column 2, line 44, as best illustrated in Fig. 5, delete this line.

Column 3, line 59, delete "58".

Signed and Sealed this

Twenty-fifth Day of May, 1993

Attest:

MICHAEL K. KIRK

Attesting Officer

Acting Commissioner of Patents and Trademarks